March 17, 1970  MASATOSHI TAKAHASHI ET AL  3,501,004
METHOD AND APPARATUS FOR FILTRATION WITH
INTERNALLY PRECOATED FILTER MEDIUM
Filed Oct. 27, 1966  3 Sheets-Sheet 1
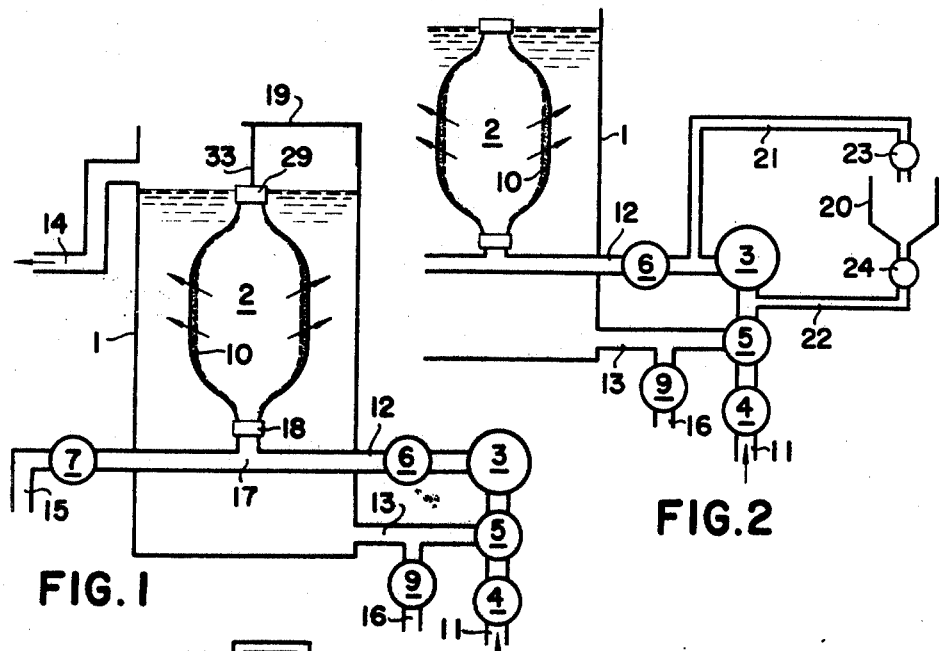
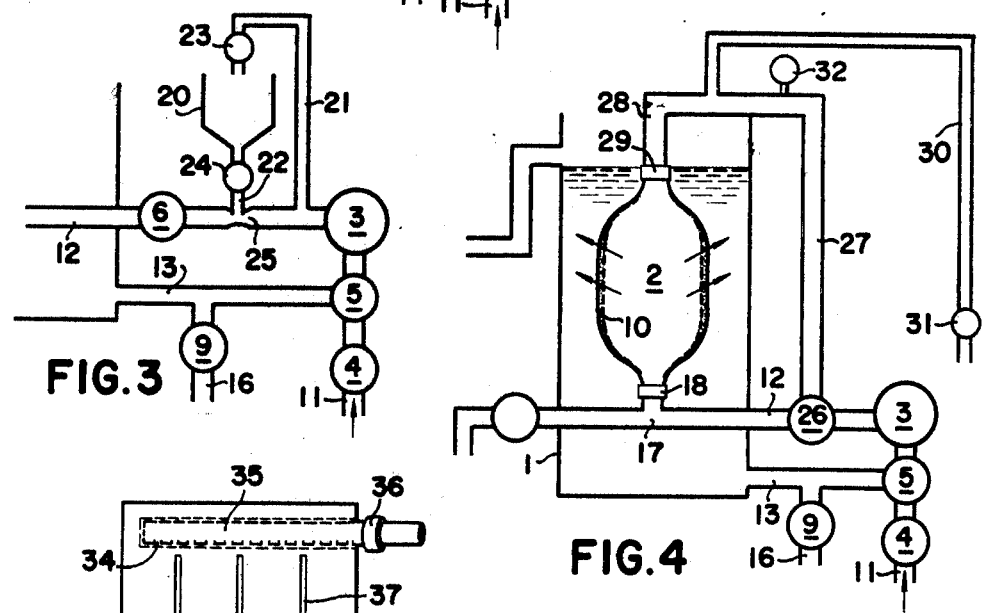
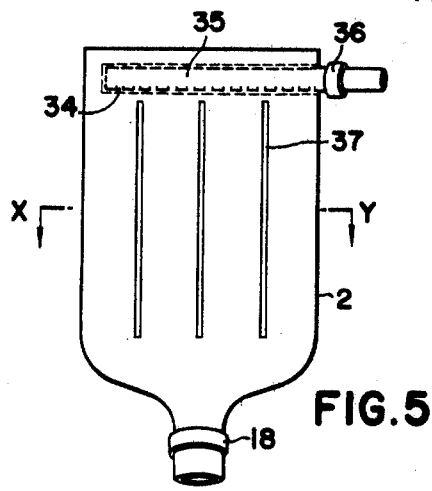
INVENTORS:
MASATOSHI TAKAHASHI
MASATSUGU IDE
BY Buckman and Archer
ATTORNEYS

INVENTORS:
MASATOSHI TAKAHASHI
MASATSUGU IDE

INVENTORS:
MASATOSHI TAKAHASHI
MASATSUGU IDE

BY Buckman and Archer
ATTORNEYS

3,501,004
Patented Mar. 17, 1970

3,501,004
METHOD AND APPARATUS FOR FILTRATION WITH INTERNALLY PRECOATED FILTER MEDIUM
Masatoshi Takahashi and Masatsugu Ide, Tokyo, Japan, assignors to Kabushiki Kaisha Sayama Seisakusho, Tokyo, Japan, a Japanese corporation
Filed Oct. 27, 1966, Ser. No. 590,051
Int. Cl. B01d 37/02
U.S. Cl. 210—75                                                    5 Claims

ABSTRACT OF THE DISCLOSURE

An open type internal pressure filtration apparatus using a soft filter bag of flexible filter cloth which has a free end without any support. Precoating material and filtered residues can be easily and completely removed from the flexible filter surface and, as the result, make the handling and treatment of the filter apparatus easy and efficient.

FIELD OF THE INVENTION

Figure 6:
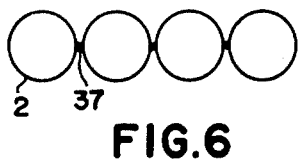

This invention relates to the method and apparatus for internal pressure filtration through filter medium precoated on the inner surface.

DESCRIPTION OF THE PRIOR ART

The filtering mechanism of the conventional precoated apparatus is such that a filtering assistant or aid from a precoating tank in which it is prepared beforehand is deposited on the surface of a filter medium placed in an enclosed pressure-resistant tank so as to form a bridge structure on the medium, thus accomplishing so-called precoating, then pressure filtration is effected through the precoated filter medium from the outside thereof, upon the completion of the filtration, the filter medium is washed with clean liquid passed in the direction opposite to that of the filtration and the above-mentioned steps are performed repeatedly. Thus, such a filtering apparatus needs a pressure-resistant tank of closed type and a precoating tank in addition to a pump. Moreover, because pressure is applied to the filter medium from the outside, it is necessary to reinforce the flexible filter medium such as filter cloth with some internal structure so that it may keep its constant figure suitable for filtration against the filtration pressure. Furthermore, in the conventional apparatus, foreign substances adhering to the filter medium cannot be easily washed away. Consequently the filter medium is rendered unusuable after repeated use over a long period of time because the filter gets clogged as the result of the incomplete washing. In such a case, it has been common practice to take out the filter medium from the closed tank by opening it and forcibly wash or replace the clogged material with new one.

SUMMARY OF THE INVENTION

This invention eliminates the defects described above. It provides the method for pressure filtration through a cylindrical filter medium the inner surface of which is precoated, characterized by the steps of precoating the inner surface of the cylindrical filter medium with a filtering assistant, introducing a liquid to be filtered into the cylinder of filter medium, filtering said liquid through the wall of the cylinder having the precoated layer, and then recovering the filtrate outside the cylinder.

It also provides the method for pressure filtration through a cylindrical filter medium having a precoated inner surface, characterized by the steps of washing away the precoated layer formed on the inner surface, when it has been clogged, with clean liquid the flow of which is directed from the outside to the inside of the cylinder of filter medium, and then forming a new precoated layer where the old one was present before washing.

The present invention further provides the method for pressure filtration through filter medium precoated on the inner surface, characterized in that, when the precoated layer is clogged, the layer is washed away by a shower from the inside or from above the outside of the filter medium, and then a new precoated layer is formed.

The invention further provides the method for pressure filtration through filter medium with a precoated inner surface, characterized in that a layer of filter assistant is formed on the inner surface of the filter medium, the precoating being accomplished with or without the circulation of a liquid in which the assistant is dispersed, between the suction side of the pump and the filter layer.

An object of the present invention is to provide a new and effective filtering apparatus using a flexible bag-type filter which eliminates the defects of conventional filters of the type described above.

Another object of the present invention is to provide a new and improved flexible bag-type filter in which the precoated material and filtered residue can be easily washed off with high efficiency.

These objects and other advantages are accomplished according to the present invention wherein there is provided an open type internal pressure filtration apparatus for processing a liquid, including an open filter tank with a filtrate discharge opening positioned at the upper portion thereof, comprising: a soft bag-shaped flexible filter within the tank having the upper portion thereof lower than the filtrate discharge opening and an opening at the bottom thereof; pump means having a suction inlet conduit from the liquid and an outlet conduit connected to the opening at the bottom of the filter; discharge means connected to the opening at the bottom of the filter for counter current washing liquid and having the unconnected end opened to the outside of the filtration system; and valve means in the inlet and outlet conduits whereby the liquid is filtered from the inside to the outside of the filter material.

According to the invention, it is not necessary to use an enclosed pressure-resistant filter tank as heretofore in use but the filtration can be performed with an open tank because the filter medium is precoated on the inner surface and the filtration is effected with pressure applied from the inside of the filter. For the purpose of the invention it is most suitable to use a soft textile cloth in cylindrical form as the filter medium. As the cloth is soft and easily deformable to any shape, an increased filtering pressure is attained and when washing is required, the same effect as the countercurrent washing is obtained by dicharging the water in the filter tank into the cylinder of filter medium. Because of the deformability, the filter medium is thoroughly cleaned and the filtration residue in the precoated layer and the liquid being filtered are removed without difficulty. A further advantage is that the filter medium can be easily taken out for washing, and on the application of pressure from the inside it can be swollen to a predetermined shape so as to withstand the filtering pressure by its own strength, without the need of any support or reinforcement.

The filter can be formed of a variety of materials other than the cylindrically shaped textile cloth. For example, it may be a tubular filter formed of unwoven cloth, or metal gauge, with or without reinforcement by wire netting, perforated plate, or latticed frame to resist the filtering pressure. Any porous filter medium formed of inorganic particles of metal or silica or of organic particles such as synthetic resin particles, either sintered or formed with synthetic resin may also be used.

Since the method of the invention dispenses with any enclosed filter tank, there is no need of providing a separate precoating tank but the filter tank may also be used as the precoating tank. As the filter tank is used in the open state, inspection and replacement of the filter medium are carried out more easily than in the conventional enclosed pressure-resistant tank. Moreover, taking the advantage of the structure which is much simpler than that of the apparatus employing the pressure-resistant tank, the number of the production steps can be decreased and the manufacturing cost is lowered.

DESCRIPTION OF THE PREFERRED EMBODIMENTS

The invention will be described hereunder in more detail with reference to the accompanying drawings. Referring specifically to FIG. 1, a liquid to be filtered is introduced into the apparatus by a pump through suction pipe 11, check valve 4, and three-way cock 5 after valve 7, 9 have been closed. Then the liquid passes through a valve 6 and pipe 12, reaching a pipe opening 17 at a connection 18 of filter medium and the pipe. Thereafter, the filter tank 1 which is not enclosed is filled with the liquid that has passed through the filter medium 2. One end of the filter medium 2 is attached to the pipe 12 at the connection 18, and the other end 29 which is closed is connected to a bar 19 projecting from the filter tank 1 by means of a band 33. In order to establish the circulation of the liquid through the filter tank, pump, and the filter medium the three-way cock 5 is adjusted so that the pump and the pipe 13 are connected while the pump and the pipe 11 are not. At this time, the liquid circulates through the filter tank 1, pipe 13, three-way cock 5, pump 3, pipe 12, filter medium 2, and back to the filter tank 1 in the order mentioned thus establishing a precoating circuit. As a filtration assistant is added to the filter tank 1, the assistant also circulates the circuit and the particles, especially of large size, are deposited on the filter medium to form a bridge structure therein, and thus precoating is accomplished.

Then, the inflow of the liquid from the pipe 13 is stopped as the three-way cock 5 is changed over to send the liquid to the pump 3 by way of the pipe 11. The liquid to be filtered then passes through the suction pipe 11, check valve 4, three-way cock 5, pump 3, valve 6, and the pipe 12 before it is filtered through the filter medium 2. The filtrate is charged into the pipe 14 in the filter tank 1.

As the filtration proceeds, the filtration residue tends to cover and clog the assistant 10 which forms the precoat on the inner surface of the filter medium 2 to such an extent that the amount of the filtrate obtained in a given period of time drops to a certain level. In such case the filtering operation must be suspended by closing the valve 6. When subsequently the valve 7 is opened, the liquid in the filter tank 1 flows through the filter medium 2 in the direction opposite to that of filtration, and washes the assistant 10 away before the liquid runs out through the discharge pipe 15.

In case where a liquid which is feared to render the washing incomplete is to be filtered, it is possible to use a three-way cock 26 as shown in FIG. 4 in place of the valve 6, so that a washing liquid from the suction pipe 11 can be led through the pipe 27 is to be jetted out in showery form in the direction from the connection 29 of the filter medium 2 and the pipe opening 28 thereby performing the washing of the interior of filter medium. In FIG. 4, air in the filter medium is released to the atmosphere through an air discharge pipe 30 by opening the valve 31, so that the pressure inside the filter medium can be determined with a pressure gage 32. As the filter 2 is formed of textile cloth having flexibility or resiliency, the washing effect may be increased by vibrating it. Furthermore, it is very easy even for an unskilled operator to take out and wash the filter 2 in a short period of time since the filter tank 1 is opened at top.

The filtration assistant may be introduced into the tank in some other ways. As shown in FIG. 2, pipe 21 having a valve 23 is connected to the discharge side of the pump 3. To receive the liquid from the pipe 21 a precoating tank 20 is provided which is communicated to the suction side of the pump 3 by pipe 22 having a valve 24. In this circuit, with the valves 23, 24 properly adjusted, a part of the liquid discharged from the pump 3 flows through the pipe 21, valve 23, precoating tank 20, valve 24, and back to the pump 3. The filtration assistant added to the precoating tank 20 at this point is for the most part sent to the pipe 12 together with the liquid. In FIG. 3, the pipe 21 is provided on the pump side of a venturi tube 25 and the pipe 22 is connected at the reduced pressure part of the venturi tube 25 in the same manner as in FIG. 2 so that if the precoating tank 20 is arranged between the two pipes the filtration assistant may be sent to the pipe 12. In FIGS. 2 and 3, the filtration assistant can be added to the apparatus even though the circulation circuit 3 for the tank 1 and the pump is omitted.

Figure 7:
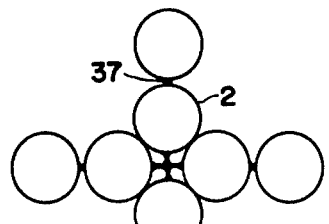
Figure 8:
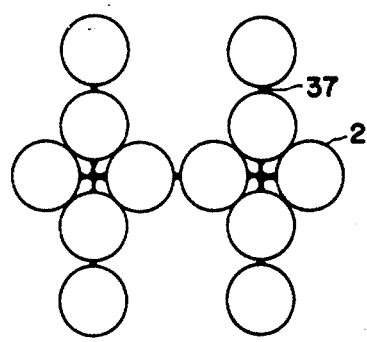

Although an embodiment of the invention employing a single bag-shaped filter is shown in FIG. 1, it is also possible that, in placing a filtering medium in the filter tank having a certain capacity, the bag-shaped filter may be partially sewn up as at 37 in the perspective view of FIG. 5, to make the filtering area as large as possible, or may be woven as a whole as shown in FIG. 5. FIG. 6 is a sectional view of the filter 2 of FIG. 5 taken along the line X–Y. As shown in FIGS. 7 and 8, the configuration of the section may be cross or H-shaped, and furthermore the section may be latticed or take the form of a plurality of parallel lines. These various shapes may be used either singly or in combination. In FIG. 5, the pipe 35 having a jet 34 like a shower nozzle is inserted in one end of the filter medium 2 to be detachably secured at 36 to bring about a favorable washing effect.

Although the filtration assistant and the liquid to be filtered have been described as introduced from below the filter medium, they may also be introduced into the apparatus in the horizontal, vertical, or diagonal direction. Moreover, the filter may be provided with a plurality of ports, or the connection 18 of the filter medium 2 and the pipe 17 in one filter tank may be divided in serveral units, and the connection 29 may likewise be divided.

In the so-called circulation filtration, as of the water of a swimming pool, whereby the filtered liquid is constantly returned to the original vessel, the precoating circulation circuit may be omitted to control the entire operation by a single valve and thus the operation is extremely simplified.

Now some embodiments of the filtering apparatus according to the invention will be explained in conjunction with the accompanying drawings. As the description has already been made of the precoating process with an assistant in circulation the stress will be put on non-cyclic precoating in the following explanation.

Figures 9, 10:
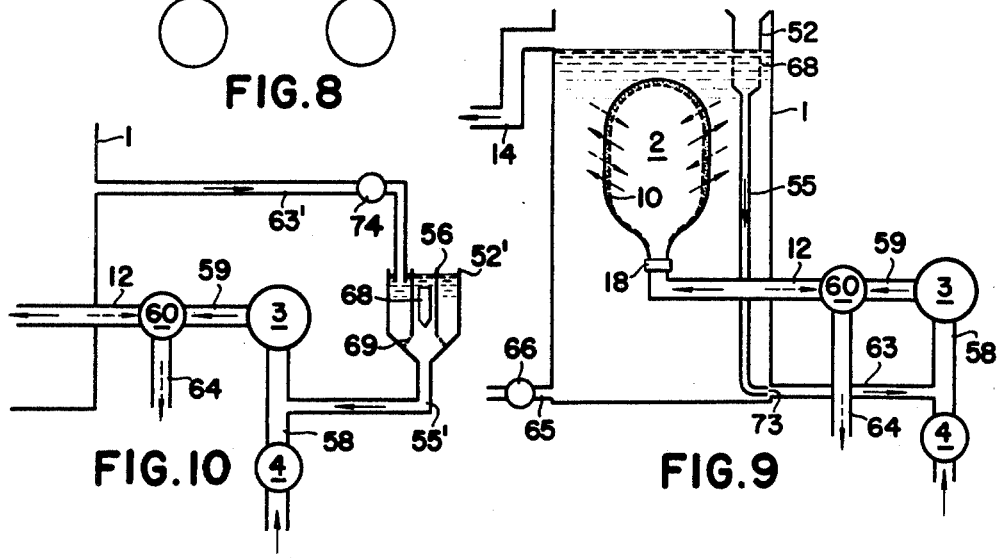

In FIG. 9, the suction pipe 58 of the pump 3 for the liquid to be filtered has a check valve 4. The discharge pipe 59 of the pump communicates to the multiple cock 60 which is connected to the filter medium 2 in the filter tank 1 by way of pipe 12. The filter medium 2 and pipe 12 are detachably coupled to each other by means of a clamp 18.

A filtration assistant 10 is precoated on the interior of the filter medium. The liquid which has passed the filter medium flows through the discharge pipe 14. The discharge pipe 63 is provided for removing the filtration residue in the filter medium through the multiple cock. On the underside of the precoating tank 52 is disposed an inflow passage 68 through which the liquid in the filter tank flows into the precoating tank by dint of the head gradient. The precoating tank 52 opens in the hole 73 on the filter tank side of a slender pipe 63, one end of which communicates to the precoating tank while the other end of which communicates to the filter tank and the suction pipe 58 for the liquid to be filtered. The pipe 65 having valve 66 is a drain pipe for the filter tank. The arrow in full line indicates the flow direction of the filtrate, and the arrow in dotted line shows the direction of the washing liquid when performing the washing of the filter medium.

Figure 11:
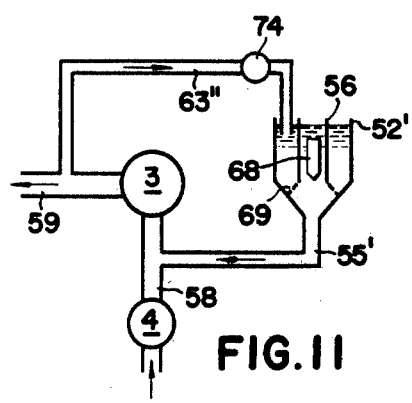
Figure 12:
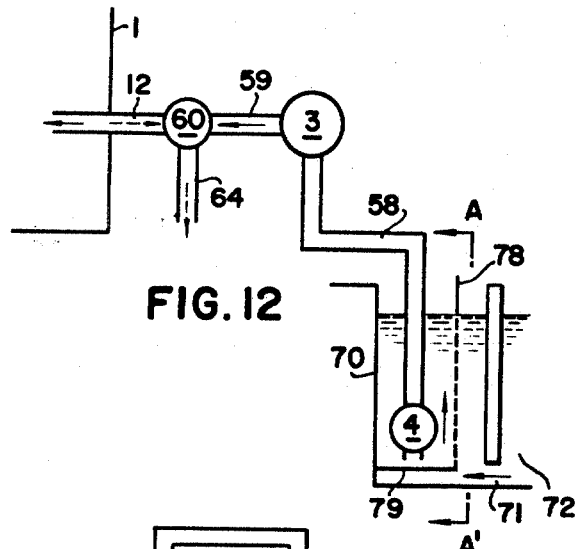
Figure 13:
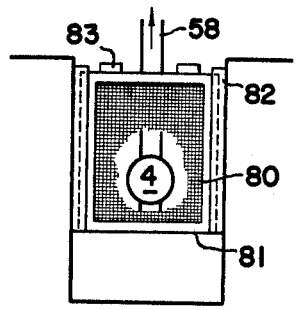

In FIG. 10, the precoating tank 52' has its lower part connected to the suction pipe 58 of the pump by means of pipe 55', and the filtrate from the filter tank flows into the precoating tank via pipe 63' by dint of the head gradient. The pipe 63' is equipped with a cock 74. In a float guide pipe 56 provided in the precoating tank is contained a float 68 which serves as a valve for opening and closing the lower port with its downward and upward movement. The port 69 opens in the lower part of the pipe 56. In FIG. 11, the liquid to be filtered from the discharge pipe 59 which extends from the pump 4 is flown, in the same way as in FIG. 10, into the precoating tank through pipe 63" by the pump pressure. The pipe 63" is provided with a cock 74. In FIG. 12, a mixing tank 70 for admixing the liquid to be filtered with diatom earth is connected by pipe 71, to the tank 72 for the liquid to be filtered, with the precoating tank being omitted. If desired, the mixing tank may be divided into two by a perforated plate 78 and partition plate 79. FIG. 13 is a section taken along the line A–A' of FIG. 12 viewed in the direction of the arrow. In the figure the perforated plate is shown as removable upward and replaceable into the mixing tank by handles 83 along guide plates 82 for the convenience in removing the comparatively large foreign substances.

Figure 14:
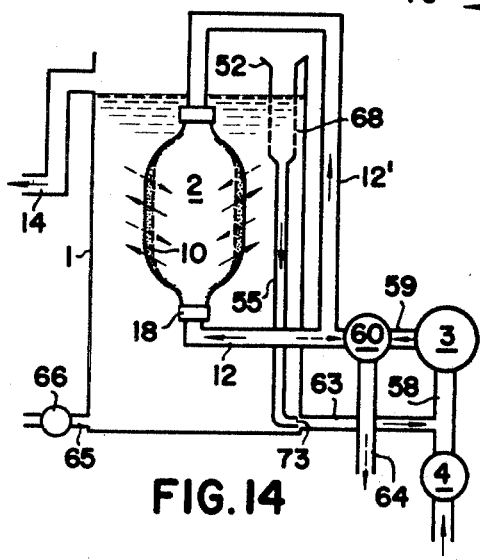
Figure 15:
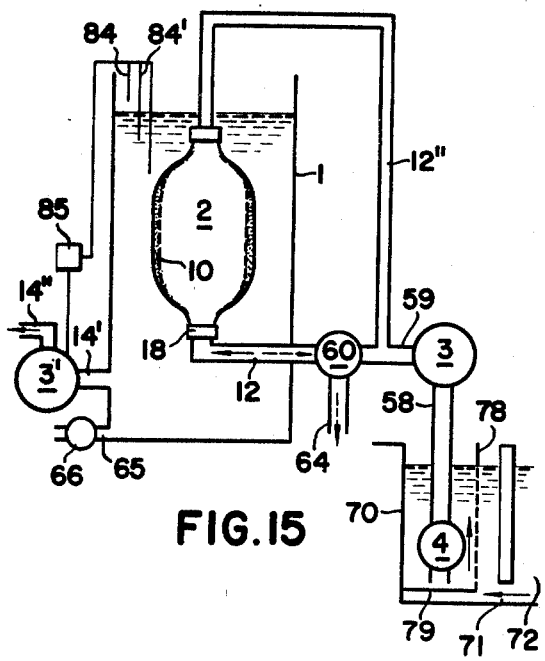
Figure 16:
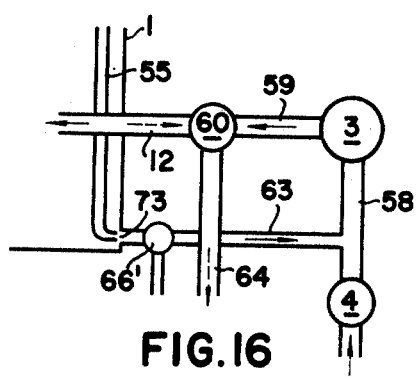

In FIG. 14, a three-way cock 60 and filter medium 2 are shown as connected by a plurality of pipes 12 and 12'. FIG. 15 shows that the pipe 12 connecting the three-way cock 60 and filter medium 2, the piping 59 connecting the three-way cock 60 and pump 3, and the filter medium 2 connected altogether by pipe 12". One end of the discharge pipe 14 of the filter tank is connected to the lower part of the filter tank and the other end to the pump 3' so that when the level of the liquid in the filter tank rises up to the top of a short electrode 84, the magnetic switch 85 is closed to actuate the pump 3' thereby delivering the liquid from the filter tank. When the liquid from the filter tank reaches the top of a medium-size electrode 84', the magnetic switch 85 is opened to stop the operation of the pump 3'. In FIG. 16, the drain port of the filter tank is connected to the pipe 63 which communicates the filter tank and the suction pipe 58 of the pump via a multiple cock 66'.

Now the filter medium shown in FIGS. 9 through 16, will be described, first, by reference specifically to FIG. 9. In the figure the multiple cock 60 is set to the position in which the pipes 59 and 12 are connected with each other and the pipe 64 is closed. Then the drain cock 66 is closed to fill the water tank 1 with the liquid to more than half the capacity. Thereafter, the pump is switched on to flow the liquid to be filtered through the check valve 4 in the first system. The liquid to be filtered passes through the pipe 58, pump 7, pipe 59, multiple cock 60, pipe 12, filter medium 2, filter tank 1, and pipe 14, in the order mentioned and then is discharged. As the pump takes a part of the liquid in the filter tank through pipe 63, the liquid in the filter tank 1 in the second system is led through pipe 55 from the hole 68 of the precoating tank 52, and is admixed with the liquid in the filter tank 1 in the hole 73 of the pipe 63 in the filter tank, and the mixture is led into the pipe 63, and thence led, together with the liquid passed through the check valve 4, into the pipe 58, pump 3, multiple cock 60, pipe 12, filter medium 2, and finally into the filter tank 1.

Next, a part of the total amount of diatom earth for precoating use is thrown into the precoating tank 52. The earth is mixed with the liquid, led together into the second system and forms a precoat on the interior of the filter medium 2. Thus a very small amount, say in the range of about 0.05 to 0.12%, of the total amount of diatom earth introduced into the apparatus is allowed to go into the filter tank 1. The filtrate can therefore be used directly in ordinary swimming pools, baths, plating baths, etc. The rest of diatom earth may be introduced into the apparatus depending on the particular filtering conditions, whereby the filtration functions can be maintained favorably for an extended period of time. Moreover, the diatom earth which passes through the pump 3 is not mixed with a large amount of liquid in 58 and passed altogether at a time, unlike in circulatory precoating, and therefore only a negligible amount of the earth leaks together with the liquid through the gland packing of the pump 3. This minimizes the danger of the pump shaft being unduly worn or impaired.

If the precoated layer is covered and clogged with the filtration residue with the progress of the filtration and must be washed, adjustments are made so that the pipes 12 and 64 are communicated with each other via the multiple cock 60 and the discharge pipe 59 of the pump is closed. Then, the liquid in the filter tank 1 will flow in the direction indicated by an arrow in dotted lines, passing through the filter medium 2, and the precoating diatom earth and filtration residue will be washed away by the counter flow and will be discharged through the pipe 12, multiple cock 60, and pipe 64. In this case, there is no need of draining the whole amount of the liquid in the filter tank 1, but the washing is accomplished almost completely in two or three minutes. If necessary, an additional effect will be obtained by setting the multiple cock 60 to a filtration circuit in which the pipes 59 and 12 are communicated with each other and the pipe 64 is closed and by filling the filter tank with the liquid, and then by flowing the liquid toward the washing circuit as indicated by the arrow in dotted lines. If the procedure is repeated twice, almost complete washing is accomplished. After the washing, the filtration operation may be resumed. As described above, the filter apparatus according to the present invention uses only one multiple cock 60 which functions as a plurality of cocks usually required and hence saves all such cocks and valves, accordingly with simplification of the operation.

In FIG. 10 the same filtration circuit as in the first system of FIG. 9 is employed. However, in the second system the precoating tank is located outside of the filter tank 1 and the liquid which has passed through the pipe 63' and cock 74 by the head gradient from the filter tank 1 flows into the precoating tank 52'. In the precoating tank 52' there is provided guide pipe 56 in which a float 68 on the mouth of pipe 55' in such manner that it sinks and serves as a stopper when the liquid in the precoating tank is decreased, or floats up and opens the mouth when the tank is full. The liquid therefore can be led into the suction pipe 58 of the pump 3 via pipe 55' while the level in the tank is maintained relatively constant. Thus, by throwing diatom earth into the precoating tank in the same way as in FIG. 9, precoating can be accomplished as well as filtration and washing. Moreover, the cock 74 can be closed where necessary.

While the pipe 63″ in FIG. 10 which feeds liquid into the precoating tank 10 extends from the filter tank 1 and the liquid is discharged by the head, the pipe in FIG. 11 extends from the discharge pipe 59 of the pump and the liquid is delivered by the pump pressure. Therefore, the apparatus can be operated entirely in the same manner as in FIG. 10.

In FIG. 12 the precoating tank is omitted and the suction pipe 58 of the pump 4 is communicated to the mixing tank 70 in which the liquid to be filtered is mixed with diatom earth. Accordingly, diatom earth is thrown into this mixing tank 70, in the same amount as in FIG. 9 for precoating purpose. The tank 72 for the liquid to be filtered is communicated with the mixing tank via pipe 91. The arrangement thus dispenses with a second system but permits filtration and washing in the same maner as in FIG. 9.

If desired, a perforated plate 78 may be provided in the mixing tank, when large particles of impurities which have flown from the liquid tank into the mixing tank by the head are kept by the baffle plate 79 and perforated plate 78 from entering the suction pipe of the pump.

As compared with the hair-collecting netting or the like in a conventional enclosed hair-collecting tank interposed in part of suction pipe for a pump, the above arrangement can have a far larger area, and hence the frequency of cleaning can be minimized. Moreover, even while the pump is running, the perforated plate 80 in FIG. 13 can be pulled up by the handles 83 from the mixing tank for facility of cleaning.

In FIG. 14 there are shown a plurality of pipes 12, 12′ which connect the multiple cock 60 with the filter medium 2, thus facilitating formation of a uniform precoated layer. The operation in this case is the same as in FIG. 9.

FIG. 15 shows a pipe 12 which connects multiple cock 60 to filter medium 2, a pipe 59 which connects the multiple cock 60 to pump 3, and a pipe 12″ which connects the pipe 59 to filter medium 2. In this case, during filtration, the multiple cock 60 is so adjusted that the pipes 12 and 59 are communicated to each other while the pipe 64 is closed. Accordingly, most of the liquid to be filtered is led through the pipe 12 into the cylinder of filter medium 2, while a part of the liquid is urged through pipe 12 into the filter through the upper part thereof. When the filter medium 2 is washed, the pipes 12 and 64 are connected to each other but the pipe 59 is closed by the multiple cock. Thus, the liquid which has passed through the pump 3 is violently forced through the pipe 12″ and jetted into filter from thereabove, so that the jet can wash away the polluted precoated layer 10 on the inner surface of the filter medium, and the washing can be drained through a route formed of the pipe 12, multiple cock 60, and pipe 64.

In case where the amount of washing from the pipe 12″ is less than the amount of liquid drained through the pipe 12, cock 60, and pipe 64, the liquid in the filter tank 1 flows through the filter medium in the direction opposite to that for filtration, thereby washing the polluted precoated layer 10 on the inner surface of the filter medium 2, and is finally drained together with the liquid showered from above the filter. Thus, an enhanced effect of cleaning is attained.

In order to urge the filtrate through the apparatus, the delivery pipe 14′ is equipped with a pump 3′, and as the water level in the filter tank 1 rises to the top end of a short electrode 84, a magnet switch 85 of the pump 3′ is actuated to start the pump and then deliver the liquid. Similarly, when the waterlevel reaches the top end of a medium-size electrode 84′ the magnet switch 85 is de-energized to stop the pump 3′. In this way the filtrate can be urged from the filter tank 1.

In FIG. 16, the drain cock 66 of the filter tank 1 as shown in FIG. 9 is omitted but a multiple cock 66′ is fitted midway the pipe 63. The multiple cock is so set that the pipe 63 alone can be communicated normally and the liquid is discharged only when the filter tank is drained.

What we claim is:

1. A filtering apparatus with a filter medium disposed within an open tank, said filter medium having inner and outer surfaces and being precoated on the inner surface with diatomaceous earth, comprising a suction pipe connecting a to-be-filtered liquid tank with the inlet to a pump, a feed pipe connecting a multiple cock with the outlet from said pump, a first pipe connecting the multiple cock with said filter medium, a filtrate discharge pipe at the upper portion of said open filter tank, the filter tank and the suction pipe being connected by a second pipe, and said filter tank having therein a precoating device including a precoating tank with an inflow passage through which the filtered liquid in the filter tank flows by dint of the head gradients, and a third pipe having one end connected to the precoating tank and the other end positioned immediately in front of the open end of the second pipe in the filter tank.

2. An open type internal pressure filtration apparatus for processing a liquid, including an open filter tank with an overflowing opening for filtrate positioned at the upper portion thereof, comprising: a soft bag-shaped flexible filter completely immersed in the liquid within said tank and having the upper portion thereof lower than said filtrate discharge opening and an opening at the bottom thereof; pump means having a suction inlet conduit from said liquid and an outlet conduit connected to the opening at the bottom of said filter; discharge means connected to said opening at the bottom of said filter for counter current washing liquid and having the unconnected end opened to the outside of the filtration system; and valve means in said inlet and outlet conduits whereby the liquid is filtered from the inside to the outside of said filter material.

3. A filtration apparatus as defined in claim 2, wherein said suction inlet conduit is connected to a filtrate circulation conduit and one end of said circulation conduit is opened to the lower portion of said filter tank, and a valve is provided to said circulation conduit to form a circuit to circulate the liquid within said filter tank through said flexible filter by means of said pump means.

4. A filtration apparatus as defined in claim 2, including an opening at the upper end of said flexible filter, and a washing pipe having one end connected with said outlet conduit by a three-way cock.

5. An open type internal pressure filtration apparatus for processing a liquid, including an open filter tank with a filtrate discharge opening positioned at the upper portion thereof, comprising: a soft bag-shaped flexible filter within said tank having the upper portion thereof lower than said filtrate discharge opening and an opening at the bottom thereof; pump means having a suction inlet conduit from said liquid and an outlet conduit connected to the opening at the bottom of said filter, said suction inlet conduit being connected to a filtrate circulation conduit and one end of said circulation conduit being opened to the lower portion of said filter tank; a valve in said circulation conduit forming a circuit to circulate the liquid within said filter tank through said flexible filter by means of said pump means; a filtration assistant mixing tank within the filter tank whose upper portion projects above the liquid surface when the filter tank is full, the lower portion of siad mixing tank being below the liquid surface; a hole pierced through the wall of said tank to allow inflow of the filtrate; an assistant suction conduit having one end facing the opening of said filtrate circulation conduit connected to the lower portion of said tank; discharge means connected to said opening at the bottom of said filter for counter current washing liquid and having the unconnected end opened to the outside of the filtration system; and valve means in said inlet and outlet conduits whereby the liquid is filtered from the inside to the outside of said filter material.

References Cited

UNITED STATES PATENTS

| | | | |
|---|---|---|---|
| 2,214,671 | 9/1940 | Hagan | 210—75 X |
| 2,576,288 | 11/1951 | Fink et al. | 210—75 |
| 2,878,938 | 3/1959 | Dee | 210—193 |
| 3,184,111 | 5/1965 | Watson et al. | 210—193 X |
| 3,195,726 | 7/1965 | Saureman et al. | 210—425 X |
| 3,252,575 | 5/1966 | Jacuzzi | 210—425 X |
| 1,214,152 | 1/1917 | Genter | 210—356 X |
| 1,696,313 | 12/1928 | Liddell | 210—356 |
| 2,724,508 | 11/1955 | Luther | 210—356 X |

SAMIH N. ZAHARNA, Primary Examiner

U.S. Cl. X.R.

210—193, 356